(12) United States Patent
Cronyn

(10) Patent No.: US 9,121,860 B1
(45) Date of Patent: Sep. 1, 2015

(54) ACOUSTIC AIRSPEED MEASUREMENT SYSTEM AND METHOD

(71) Applicant: The United States of America as represented by the Secretary of the Navy, Washington, DC (US)

(72) Inventor: Willard M. Cronyn, San Diego, CA (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 0 days.

(21) Appl. No.: 13/780,182

(22) Filed: Feb. 28, 2013

(51) Int. Cl.
*G01P 5/24* (2006.01)
*G01P 3/00* (2006.01)

(52) U.S. Cl.
CPC . *G01P 5/245* (2013.01); *G01P 3/00* (2013.01); *G01P 5/248* (2013.01)

(58) Field of Classification Search
CPC ............ G01P 5/245; G01P 5/24; G01P 5/248
USPC ......................................... 701/7, 14; 702/144
See application file for complete search history.

(56) References Cited

U.S. PATENT DOCUMENTS

| 3,222,926 | A | * | 12/1965 | Carver ............................ 73/180 |
| 3,751,979 | A | * | 8/1973 | Ims ........................... 73/861.27 |
| 4,038,870 | A | | 8/1977 | Rotier |
| 5,333,508 | A | * | 8/1994 | Petroff et al. .............. 73/861.25 |
| 5,343,744 | A | | 9/1994 | Ammann |
| 6,601,447 | B1 | | 8/2003 | Loucks |
| 2012/0173191 | A1 | * | 7/2012 | Moeller ........................ 702/142 |

FOREIGN PATENT DOCUMENTS

| CA | 2672113 A1 | * | 1/2011 |
| FR | 2948458 A1 | * | 1/2011 |
| FR | 2974908 A1 | * | 11/2012 |

OTHER PUBLICATIONS

Muller et al., Handbook of Engineering Acoustics, Nov. 6, 2012, Springer, Edition 2013, Chapter 2.*
Machine Translation of Description: Thuries, French Patent Publication FR 2948458 A1, Date of Publication Jan. 2011.*

(Continued)

*Primary Examiner* — John Q Nguyen
*Assistant Examiner* — Nadeem Odeh
(74) *Attorney, Agent, or Firm* — SPAWAR Systems Center Pacific; Kyle Eppele; Ryan J. Friedl

(57) ABSTRACT

A system and method involve determining the airspeed of a vehicle using the propagation time of an acoustic signal from a transmitter located at one end of the vehicle to a receiver located at the other end of the vehicle. A digital representation of the acoustic signal is created and stored within non-volatile memory within the transmitter, then converted into an electrical signal which is filtered, amplified, and input into a transducer contained within the transmitter. The transducer radiates an acoustic signal toward the receiver, which receives and filters the acoustic signal, converts it into a digital signal, and processes the digital signal to determine the acoustic signal propagation time. The acoustic signal may have a continuous wave form, a duty cycle of about 100%, a peak to average amplitude ratio of less than about 2.5, and Fourier components of substantially equal amplitude and random phase.

12 Claims, 9 Drawing Sheets

(56) References Cited

OTHER PUBLICATIONS

Machine Translation of Description: Schegerin, French Patent Publication FR 2974908 A1, Date of Publication Nov. 2012.*
National Instruments: LabVIEW 2011 Help, Common Test Signals, Jun. 2011, National Instruments Corporation (http://zone.ni.com/reference/en-XX/help/371361H-01/lvanlsconcepts/common_testsignals/).*
National Instruments: LabVIEW 2011 Help, Basic Multitone VI, Jun. 2011, National Instruments Corporation (http://zone.ni.com/reference/en-XX/help/371361H-01/lvwave/basic_multitone/).*
National Instruments: LabVIEW 2011 Help, Multitone Generation, Jun. 2011, National Instruments Corporation (http://zone.ni.com/reference/en-XX/help/371361H-01/lvanlsconcepts/multitone-generation/).*

National Instruments: LabVIEW 2012 Help, Crest Factor, Jun. 2012, National Instruments Corporation (http://zone.ni.com/reference/en-XX/help/371361J-01/lvanlsconcepts/lvac_crest_factor/).*
Friese, Multitone Signals with Low Crest Factor, Oct. 1997, IEEE Transactions on Communications, vol. 45, No. 10.*
Burk et al., Music and Computers: Ch. 3: The Frequency Domain, Section 3.4, May 2011.*
Pitot-Static Tube, http://www.grc.nasa.gov/WWW/k-12/airplane/pitot.html.
Liljencrants, Johan, "Q value of a pipe resonator," http://www.fonema.se/qpipe/qpipe.htm.
Hodgdon, Kathleen K, et al., "Low Frequency Noise Study," Final Report for Partnership for Air Transportation, Noise, and Emissions Reduction, Apr. 2007.

* cited by examiner

700

800

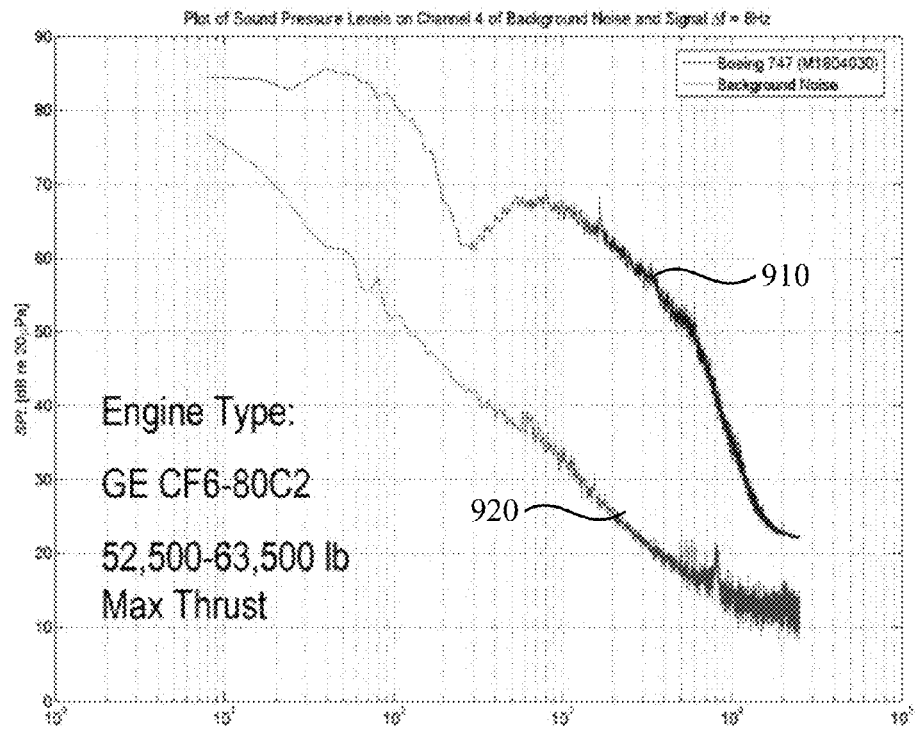
PRIOR ART  FIG. 12
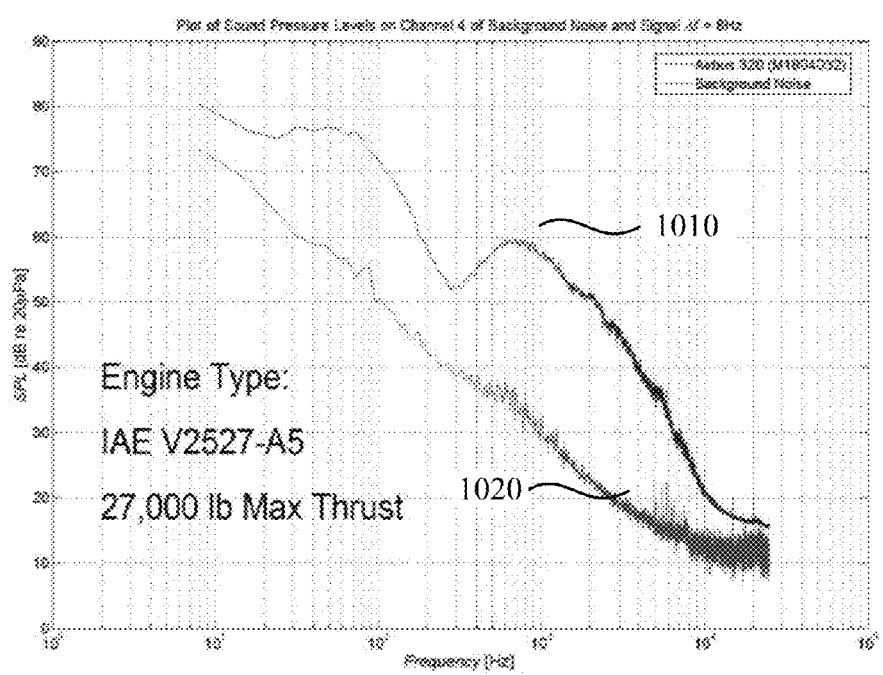
PRIOR ART  FIG. 13

ACOUSTIC AIRSPEED MEASUREMENT SYSTEM AND METHOD

FEDERALLY-SPONSORED RESEARCH AND DEVELOPMENT

The Acoustic Airspeed Measurement System and Method is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac_T2@navy.mil; reference Navy Case Number 102148.

BACKGROUND

True airspeed is perhaps the single most important parameter in assessing the performance of an aircraft whether in flight, landing, or taking off. The measurement of airspeed, even for the latest generation of aircraft, is performed using a Pitot-Static tube, also known as a Prandtl tube. In a Pitot-Static tube, the transducer measures the difference in pressure between static pressure and a total pressure by measuring the strain in a thin element using an electronic strain gauge. With measurements of air temperature and pressure to determine air density, the strain gauge measurement is converted to airspeed.

There are several known limitations to the Pitot-Static tube. First, if the velocity is low, the difference in pressures is very small and hard to accurately measure with the transducer. Accordingly, errors in the instrument could be greater than the measurement. This limitation means that Pitot-Static tubes do not work well near stall velocities, which is exactly the airspeed range where accurate measurements are imperative. Second, if the velocity is very high (supersonic), the assumptions of Bernoulli's equation have been violated and the measurement is wrong again. At the front of the tube, a shock wave appears that will change the total pressure. However, corrections for the shock wave can be applied to allow use of Pitot-Static tubes for high speed aircraft. Third, if the Pitot-Static tube becomes pinched through mechanical damage or clogged by dirt, ice, or even insects, the resulting pressures at the transducer will not represent the total and static pressures of the external flow. The transducer output that is then used to calculate a velocity will not represent the actual velocity of the flow.

Without a functioning Pitot-Static tube, a plane's flight computer will be unable to accurately and correctly determine speed, causing the automatic pilot control system to shut down and revert to manual control, forcing pilots to take control in sometimes challenging flying conditions. In some instances, issues with Pitot-Static tube have unfortunately been the cause of several accidents, such as Air France flight 447 and Birgenair flight 301, involving significant losses of life. There is a need for an improved system and method for measuring an airplane's airspeed that overcomes the above-mentioned drawbacks.

BRIEF DESCRIPTION OF THE DRAWINGS

FIGS. 12 and 13 show graphs illustrating the jet engine noise level from two commercial airplanes during landing.

DETAILED DESCRIPTION OF SOME EMBODIMENTS

Figure 1:
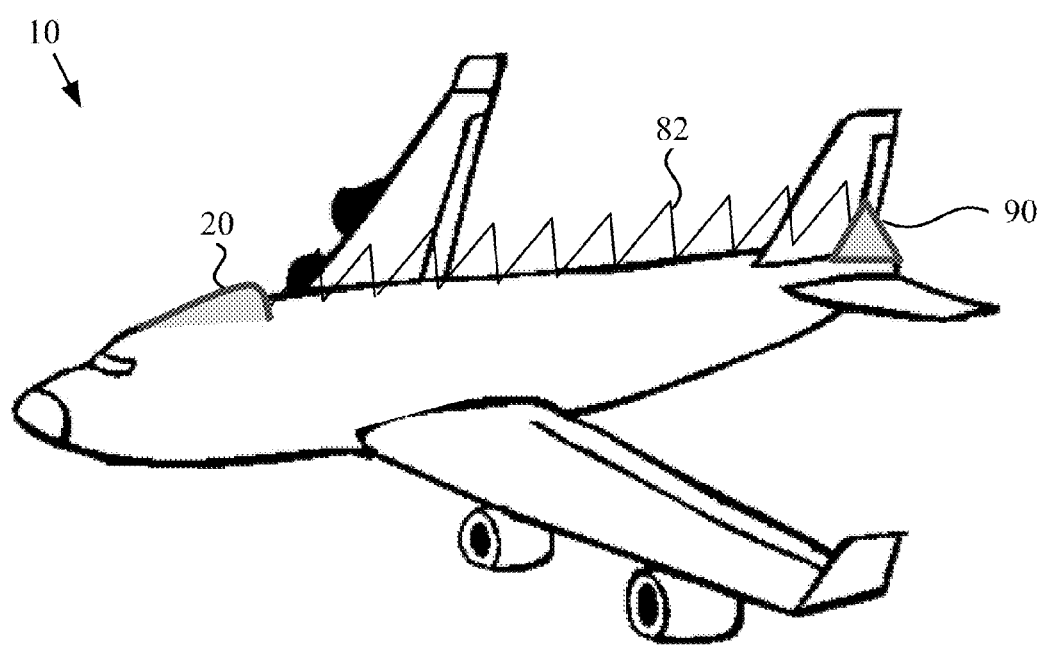
FIG. 1 shows a diagram of an exemplary location of an acoustic airspeed measurement system on a vehicle.

The embodiments of the subject matter disclosed herein measure a vehicle's airspeed by radiating an appropriate acoustic waveform from a transmitter and measuring the time-of-flight of the waveform to an acoustic signal receiver. As an example, FIG. 1 shows an embodiment of the system 10 implemented in an aircraft. As shown, a transmitter 20 may be on the forward part of the aircraft, which includes the nose portion and cockpit, such as on top of the fuselage under a suitable streamlined hood. The transmitter radiates an acoustic signal 82 that is received at an acoustic signal receiver 90, which may be located, for example, inside the tail of the aircraft for protection against weather elements such as rain and snow. In other embodiments, there may be other, more suitable locations for transmitter 20 and receiver 90. Further, for an enhanced, vector wind speed measurement system, there may also be transmitters located on the wings of the aircraft, probably near the wing tips to increase the effective baseline. The distance between transmitter 20 and receiver 90 may vary depending on the size and configuration of the particular aircraft.

Embodiments of the system and method discussed herein may be used to measure airspeed for any type of vehicle including aircraft, ground-based vehicles, and floating maritime vessels, provided the proper system configuration adjustments are performed. Some embodiments of the system and method may even be used to measure flow speed of any gas or liquid in a wide variety of configurations. For example, the system and method could be used to measure the flow velocity profile of a river by installing one or more transducers on one side of the river, and one or more acoustic receivers on the opposite side of the river.

With regard to aircraft, although there are complexities associated with transonic and supersonic speeds which are not addressed herein, necessary variations in system 10 and method 1100 to address such complexities may be evident to one having ordinary skill in the art. Further, although the acoustic noise level in the vicinity of an aircraft is very high, the use of a suitable waveform and modern signal processing techniques, as discussed herein, enable the measurement of airspeed using an acoustic signal.

Using an aircraft as an example, the embodiments of the system and method described herein make a direct measurement of propagation delay between two known reference points on the aircraft. The measurement is performed with a signal whose absence or corruption can easily and automatically be determined regardless of the status of the aircraft, whether landing, on the ground, take off, or cruising. The system is advantageous over existing methods in that the functionality of the system can be determined during an automatic pre-flight check out and can also be calibrated while on the ground. Further, the error in determination of airspeed is smallest at low airspeeds (accuracy is most important near the aircraft stall speed). The system uses a 100% duty cycle, low crest factor waveform, which reduces transducer driver power requirements. By using additional axes, such as wingtip to tail, the vector wind velocity can be determined.

The basis for determining airspeed from a measurement of propagation time of an acoustic signal is the simple relationship between the velocity of propagation, $V_p$, of an acoustic wave from point A to point B, the airplane airspeed, $V_a$, and the speed-of-sound in still air, $V_0$, is $$V_p = V_a + V_0 \qquad \text{(Eq. 1)}$$

where the speed-of-sound $V_0$ is a function of air temperature, where, as noted in "Acoustic Properties of Gases," American Institute of Physics, 3$^{rd}$ edition, 3d, Leo L. Beranek, p. 3-74, $$V_0 = 331.3 \text{ m/s} \ast [1 + T/273.15]^{1/2} \qquad \text{(Eq. 1.1)}$$

where T is air temperature, degrees Celsius. At sea level at 20° C., $V_0$ is 340.29 m/s and at 11-20 km (where most commercial jets cruise), at –57° C., 295 m/s. The propagation time τ for an acoustic signal to travel over a baseline L is given by $$\tau = L/(V_a + V_0) \qquad \text{(Eq. 2)}$$

where $V_a$ is the component of the airplane velocity vector projected onto the baseline L. Thus, given that $V_0$ is known from outside air temperature data already collected by aircraft, and L is known, Eq. 2 can be inverted to solve for $V_a$ from measurements of τ

$$V_a = L/\tau - V_0 \qquad \text{(Eq. 3)}$$

For L=40 m, which is about ⅔ length of a Boeing 787 or an Airbus 330, τ at sea level will be between 58.8 (aircraft at Mach 1, speed of sound) and 117.5 (stationary aircraft) msec. For an aircraft at 11-20 km, τ will be between 67.8 (Mach 1) and 135.6 msec. Thus, the overall limits for τ for subsonic aircraft are between 58.8 and 135.6 msec, an over-all range of $\tau_R$=76.8 msec. In terms of measurement accuracy for τ, evaluating the relationship between error in τ and error in $V_a$ by differentiating Eq. 2 gives $$d\tau/dV_a = -L/(V_a + V_0)^2 \qquad \text{(Eq. 4)}$$

Thus, for a specified accuracy in measurement of aircraft velocity, $dV_a$, the maximum accuracy in measurement of τ, i.e. minimum dτ, will be required when $(V_a + V_0)$ is a maximum. High accuracy measurements (small dτ) are presumably most urgently needed when a plane is close to stall speed rather than when it is close to Mach 1. A typical maximum stall speed for commercial jet aircraft at sea level ($V_0$=340.3 m/s) is about 150 knots, or $V_a$ about 80 m/s, giving dτ about 0.10 msec for L=40 m and $dV_a$=2.4 m/s (about 5.3 MPH). From the basic time-frequency domain relationship: bandwidth Df, required to achieve a measurement error of τ, is approximately Df=1/τ, the requisite Df is ~10 kHz. The conventional technique used to measure a delay to within some accuracy dτ is to generate a pulse with leading and trailing edge times of about dτ/2.

A measurement using a pulse will have a high crest factor, or peak-to-average power ratio. With an over-all variation in τ of 76.8 msec a simple, unambiguous determination of τ requires a pulse period of at least 76.8 msec. Thus, for a pulse width of 0.1 msec the duty cycle is only 0.1/76.8=0.13%. Since measurement accuracy depends on average power, not peak power, both the transducer driver amplifier and the transducer itself would need 768 times the peak power rating as a scheme based on a continuous waveform. It should be noted that there are pulse measurement schemes using variable pulse periods which could reduce the crest factor i.e., increase the duty cycle, but the requisite bandwidth would still be ~10 kHz.

Figure 5:
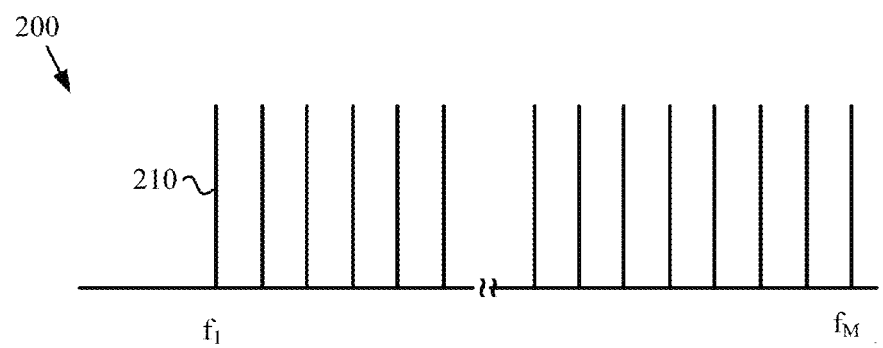
FIG. 5 shows a diagram of a comb line spectrum that may be generated in accordance with the Acoustic Airspeed Measurement System and Method.

As will be discussed herein, there is another approach to measuring the propagation delay which requires much less peak power and bandwidth. The approach also uses a 100% duty cycle waveform, perhaps the simplest to synthesize and process for the aircraft configuration. The waveform is a comb line ensemble of equally spaced spectral lines of approximately the same amplitude, as shown in FIG. 5.

Figure 2:
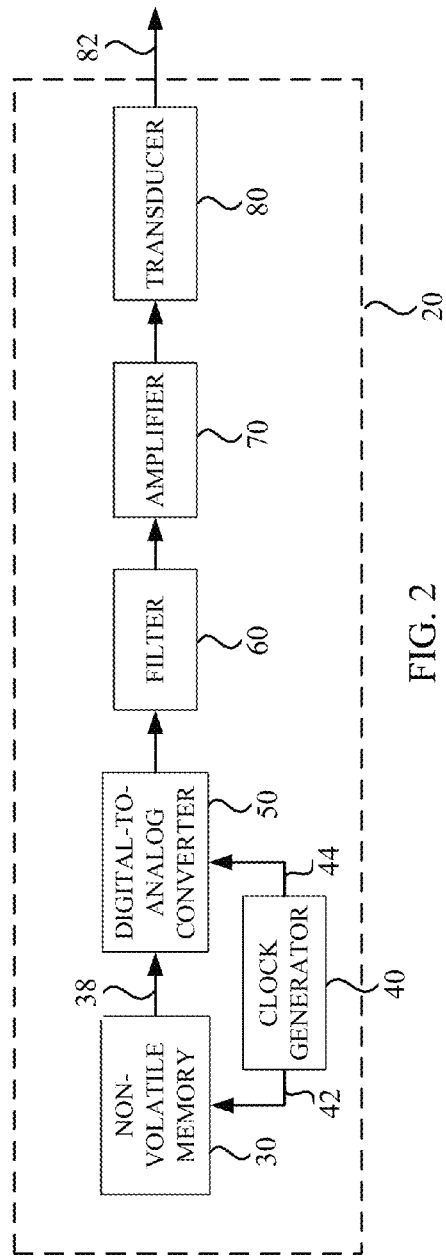
FIG. 2 shows a diagram of an embodiment of a transmitter for use in accordance with the Acoustic Airspeed Measurement System and Method.

FIG. 2 shows a diagram of an embodiment of transmitter 20. Transmitter 20 includes non-volatile memory 30, clock generator 40, digital-to-analog-converter (DAC) 50, filter 60, amplifier 70, and transducer 80, all of which are Commercial Off The Shelf (COTS) components. In some embodiments, memory 30 may be configured to have a digital representation of an acoustic signal stored therein. As an example, this may occur at the system vendor's fabrication facility. The time domain coefficients stored in the memory 30 can be synthesized under a variety of applications software such as EXCEL® and MATLAB®. Clock generator 40 is operatively connected to both memory 30 and DAC 50 and is configured to send a clock signal 42 to memory 30 and simultaneously a clock signal 44 to DAC 50.

DAC 50 is operatively connected to memory 30 and clock generator 40 and is configured to receive the digital representation of the acoustic signal 38 and convert the digital representation of the acoustic signal 38 into an electrical signal. Filter 60, which is operatively connected to DAC 50, is configured to filter the electrical signal. Amplifier 70, which is operatively connected to filter 60, is configured to amplify the filtered electrical signal. Transducer 80, which is operatively connected to amplifier 70, is configured to receive and radiate the amplified electrical signal as an acoustic signal 82 towards receiver 90.

As an example, acoustic signal 82 is comprised of Fourier components of substantially equal amplitude. In some embodiments, the amplitudes have standard deviations of less than about 1.4 dB. Further, in some embodiments, the Fourier components have random phase. Acoustic signal 82 may also have a continuous wave form, a duty cycle of about 100%, and a peak to average amplitude ratio of less than about 2.5.

Figure 3:
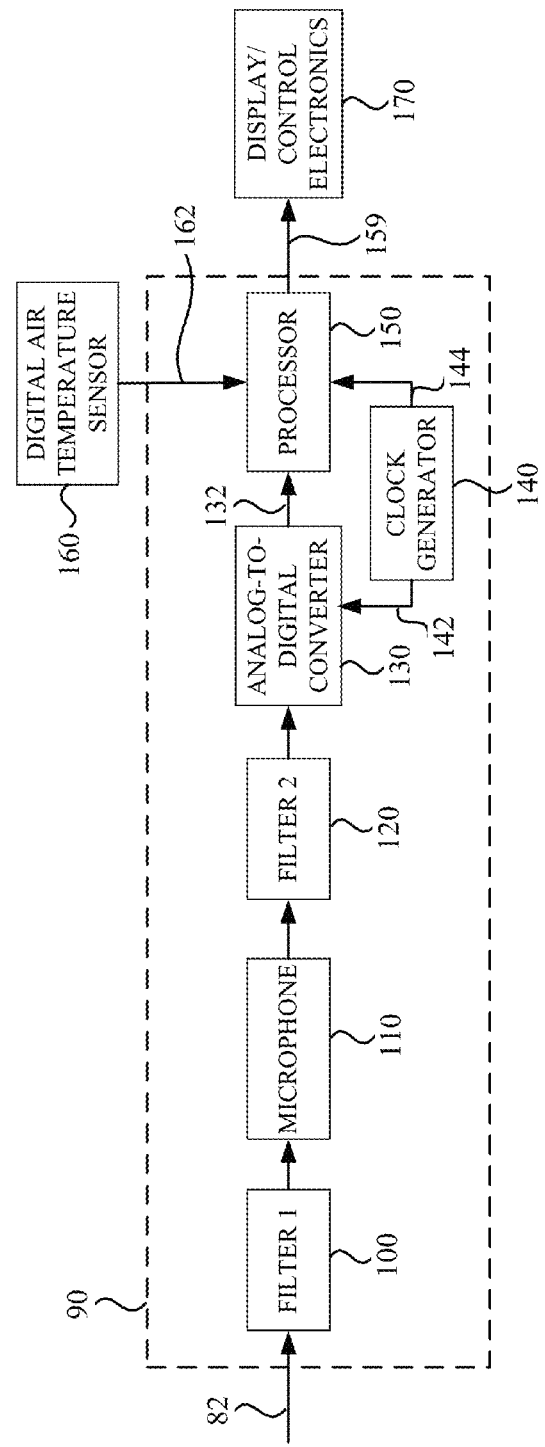
FIG. 3 shows a diagram of an embodiment of an acoustic signal receiver for use in accordance with the Acoustic Airspeed Measurement System and Method.

FIG. 3 shows a diagram of an embodiment of acoustic signal receiver 90. Receiver 90 includes first filter 100, an example of which is a mechanical acoustic filter, microphone 110, second filter 120, an example of which is an electronic filter, analog-to-digital converter (ADC) 130, clock generator 140, and processor 150, all of which are COTS components.

Filter 100, an example of which is a quarter wavelength close-pipe resonator filter, is designed to suppress the very high power low frequency engine noise components and to pass the synthesized signal 82 to microphone 110. In embodiments where a closed-pipe resonator is used, microphone 110 may be embedded in the closed end of the pipe of filter 100. At a center frequency of 10 kHz, such a pipe would be less than 1 cm long. Since the resonant frequency of such a filter varies directly in proportion to the speed of sound, the center frequency of the acoustic waveform may have to be changed in accordance with the change in speed of sound as determined by the air temperature. Although a closed-pipe resonator can have a very high Q (narrow bandwidth), there are well-known schemes for reducing Q control using hole in pipe, such as is discussed by Johan Liljencrants in a webpage titled "Q value of a pipe resonator".

Microphone 110 is operatively connected to acoustic filter 100 and is designed to convert the filtered acoustic signal into a received electrical signal. Electronic second filter 120 is operatively connected to microphone 110 and is designed to suppress signals lower and higher in frequency than those contained within the synthesized acoustic signal. ADC 130 is operatively connected to second filter 120 and is designed to convert the received electrical signal into a received digital signal. Clock generator 140 is operatively connected to ADC 130 and processor 150 and is configured to send a clock signal 142 to ADC 130 and simultaneously send a clock signal 144 to processor 150. In accordance with the Nyquist-Shannon sampling theorem, the clock signal frequency must be more than twice the highest frequency being sampled.

Processor 150 is operatively connected to both ADC 130 and digital air temperature sensor 160. As shown, sensor 160 is located outside of receiver 90. However, in some embodiments of system 10, sensor 160 may be located within receiver 90. Processor 150 is configured, with the appropriate software or with access to the appropriate software, to process the received digital signals 132 from ADC 130 and 144 from clock generator 140 to determine a propagation time from the transmitter to the acoustic signal receiver, as well as to use the propagation time and digital outside air temperature signal 162 from digital temperature sensor 160 to determine an airspeed for the vehicle. For example, the propagation time may be determined by using Eq. 2 from above and the speed of sound $V_0$ from Eq. 1.1. A signal 159 representing the airspeed of the vehicle is then sent to a cockpit display and/or control electronics circuitry 170, which are located externally to receiver 90.

Figure 4:
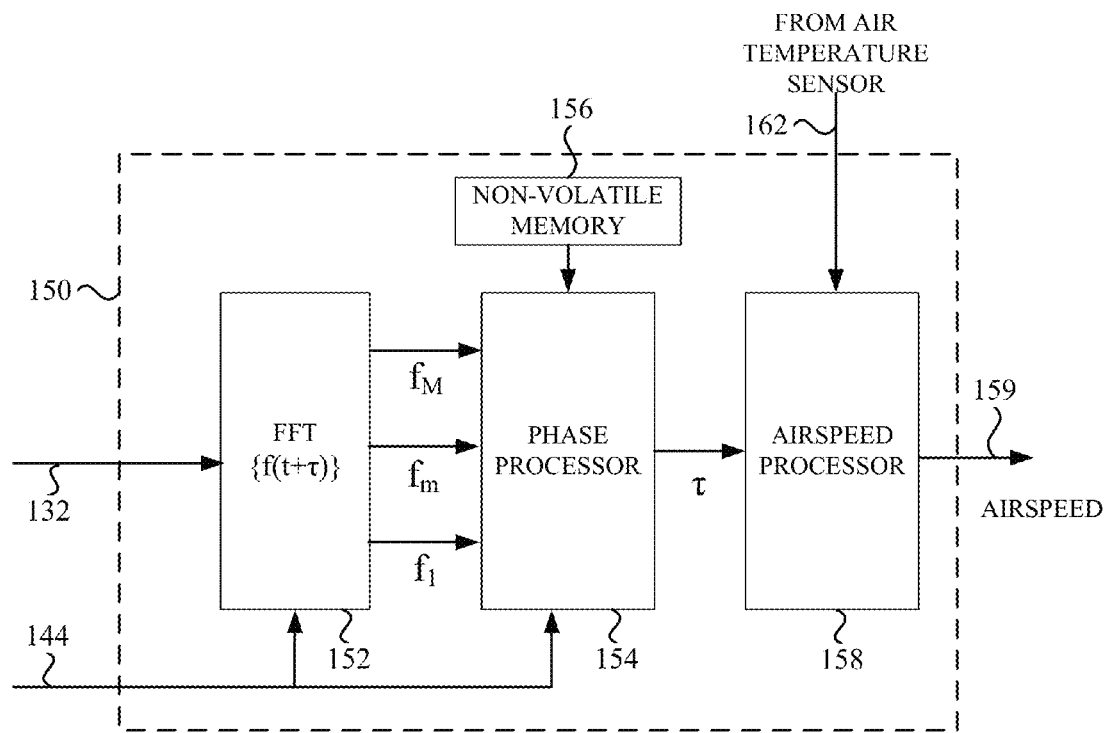
FIG. 4 shows a diagram of an embodiment of the processing and signals contained within the acoustic signal receiver in accordance with the Acoustic Airspeed Measurement System and Method.

More details of the propagation delay time processing are shown in FIG. 4. FIG. 4 shows a diagram illustrating the components and signals within processor 150. The output 132 of ADC 130 is sent to Fast Fourier Transform (FFT) processor 152, which computes the amplitude and phase of each of the spectral components of the acoustic waveform and routes the output to a phase processor 154. The time delay $\tau$ is extracted from measurements of the phase, $\phi$, of the Fourier components using the well-known relationship $\tau = d\phi/df$, where $d\phi/df$ is the average gradient of phase as a function of frequency.

The fundamental advantage of the FFT is that it is equivalent to an ensemble of extremely narrow filters, which greatly suppress signals outside the filter. The acoustic waveform components fit exactly into the center of their respective filters. Although the overall power of the acoustic delay measuring signal is low compared to the over-all background noise level of the jet engine and wind noise, within each filter the AAMS component is much higher than the background noise, an advantage of the FFT which is well-known to those who practice the art of signal processing. It should be noted that transform processor 152 may be configured to perform other processing in addition to, or in lieu of, a FFT, as would be recognized by one having ordinary skill in the art.

Figure 6:
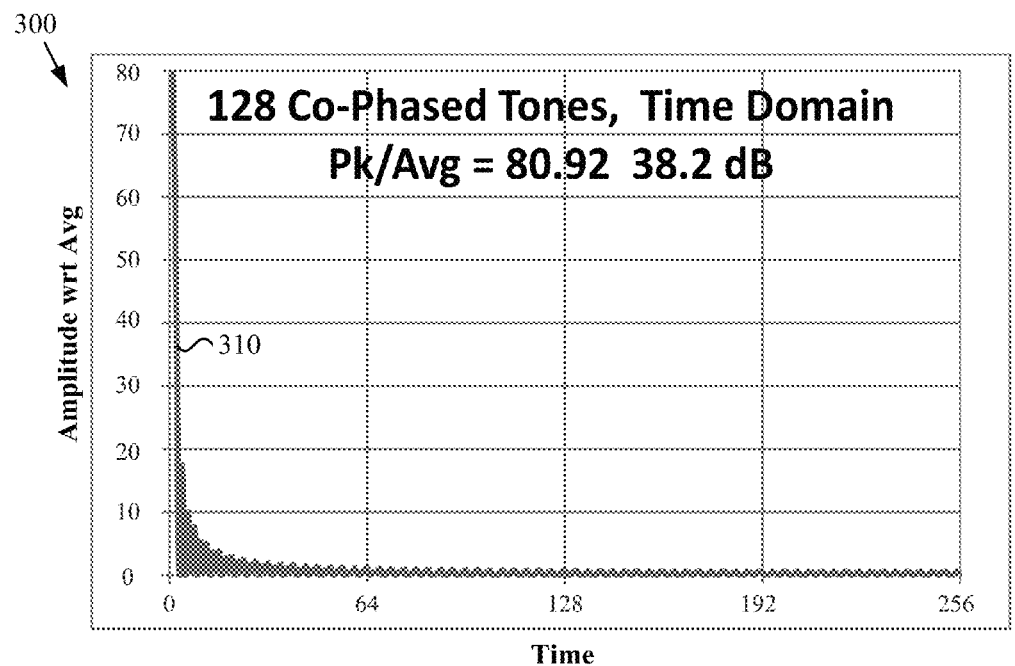
FIG. 6 shows a graph of a time domain signal containing 128 uniformly spaced, equal-amplitude, co-phased tones having a peak-to-average power ratio of 8092 that may be used in accordance with the Acoustic Airspeed Measurement System and Method.

Also, the M quasi-random phase values, which are stored in non-volatile memory 156, are subtracted from the phase as measured for each of the M frequency components. These random phase values are the same random phase values that were imposed on the transmitted acoustic signal. If the Fourier components were all co-phased, i.e. at some point in time all components were at the same phase e.g., 0, then the measured phases could be input directly to phase processor 154, which would then calculate the component to component phase shift, thereby measuring the delay value $\tau$. However, as shown in FIG. 6, if the components are co-phased, the resultant time domain waveform has an extremely high peak-to-average ratio. To drastically reduce the peak-to-average ratio the phases were randomized in the transmitted waveform. However, those random phase values must then be subtracted from the measured values before the frequency-to-frequency phase shift can be evaluated. The same set of random phase values is loaded into non-volatile memory 30. Phase processor 154 is configured to determine the slope of the phase change as a function of frequency of the input signal from transform processor 152. Essentially, this provides the average component to component change in phase, which represents the delay value $\tau$ shown in Eqs. 2 and 3 above.

The requisite processing of phase measurements is shown in Table 1 below with synthetic data for 16 frequencies at increments of 10 Hz and a transmit-to-receive acoustic path of 40 meters. To introduce additional realism, the received measured phase (RMP) shown in col. 4 of Table 1 has zero-mean noise with a standard deviation of 0.02 cycles added to it.

The frequency increment must be small enough that the phase increment is less than 1 cycle at the largest possible propagation time $\tau$. For example, at sea level, at 20 deg C, $V_0$=340.3 m/s, a baseline of 40 m, and an aircraft speed of $V_a$=116.0 knots=59.7 m/s, $\tau$=100 msec which suggests that the maximum frequency increment should be 10 Hz. However, even if the aircraft airspeed is M 1, $\tau$ will be $L/V_0$=40/(2*340.3)=59 msec. Thus, there cannot be any question about whether, with an increment of 10 Hz, a measured phase increment of 1 could really be 0, as a 0 phase increment is impossible.

The maximum delay, at an altitude where $V_0$=295 m/s, and for $V_a$=59.7 m/s, is 115 msec for a minimum to maximum variation in $\tau$ of 56 msec. 1/56 msec=17.9 Hz. A frequency increment of 15 Hz should be adequate to ensure that there is no frequency-to-frequency phase ambiguity. A single phase measurement can only yield a value between 0 and 1 cycle, as shown in the measured phase column. However, the phase must increment by 0 to 1 cycles. Thus a phase wrap can be sensed by subtracting the previous phase from the current phase measurement.

If the difference is less than 0, the phase has been "wrapped" and the actual phase must be as measured plus the wrap by 1. The wrap affects all subsequent measurements until the next phase wrap, which results again in a phase increment of 1. The cumulative wrap count must be maintained frequency-to-frequency. The unwrapped phase is the sum of the measured phase and the cumulative phase wrap count. For these synthetic data, the phase at component 16 has been wrapped 11 times. The delay is the RMS best-fit slope of the unwrapped phase as a function of frequency; for these data it is 71 msec.

average ratio, of 80.9, or a Peak to Average Power Ratio (PAPR) of 6549 (38.2 dB). Since the amplifier and transducer power handling rating is based on peak power, whereas signal-to-noise ratio depends on average power, a PAPR of 6549 requires far higher power rated components than a waveform with a lower PAPR.

TABLE 1

|  |  | transmitted | received |  |  |  |  |  |
|---|---|---|---|---|---|---|---|---|
| component | f, Hz | random phase, cycles | measured phase, cycle | corrected phase, cycles | phase change | phase wrap flag | cumulative wrap count | unwrapped phase, cycles |
| 1 | 10 | 0.96 | 0.5535 | 0.5946 |  |  |  | 0.5946 |
| 2 | 20 | 0.48 | 0.7807 | 0.3047 | −0.2899 | 1 | 1 | 1.3047 |
| 3 | 30 | 0.93 | 0.9517 | 0.0188 | −0.2859 | 1 | 2 | 2.0188 |
| 4 | 40 | 0.32 | 0.0327 | 0.7109 | 0.6921 | 0 | 2 | 2.7109 |
| 5 | 50 | 0.36 | 0.7834 | 0.4219 | −0.2890 | 1 | 3 | 3.4219 |
| 6 | 60 | 0.81 | 0.9108 | 0.0999 | −0.3220 | 1 | 4 | 4.0999 |
| 7 | 70 | 0.96 | 0.7666 | 0.8031 | 0.7032 | 0 | 4 | 4.8031 |
| 8 | 80 | 0.22 | 0.7851 | 0.5633 | −0.2398 | 1 | 5 | 5.5633 |
| 9 | 90 | 0.68 | 0.9525 | 0.2676 | −0.2957 | 1 | 6 | 6.2676 |
| 10 | 100 | 0.97 | 0.9042 | 0.9368 | 0.6692 | 0 | 6 | 6.9368 |
| 11 | 110 | 0.95 | 0.6220 | 0.6672 | −0.2696 | 1 | 7 | 7.6672 |
| 12 | 120 | 0.96 | 0.3094 | 0.3523 | −0.3149 | 1 | 8 | 8.3523 |
| 13 | 130 | 0.51 | 0.6322 | 0.1175 | −0.2348 | 1 | 9 | 9.1175 |
| 14 | 140 | 0.99 | 0.8116 | 0.8214 | 0.7039 | 0 | 9 | 9.8214 |
| 15 | 150 | 0.40 | 0.9140 | 0.5142 | −0.3072 | 1 | 10 | 10.5142 |
| 16 | 160 | 0.50 | 0.7200 | 0.2155 | −0.2987 | 1 | 11 | 11.2155 |
|  |  |  |  |  |  |  | slope (delay) | 0.0709 |

Suppose these measurements have been made over a baseline of 40 m on an aircraft flying at 11-20 km, for which the speed of sound is 295 m/s. Then, from Eq. 3, $V_a = L/\tau - V_0 = 269.34$ m/s=523.55 knots=Mach 0.91.

Because propagation time is measured using the phase slope across the spectrum, there is no need to preserve absolute phase from transmit to receive and therefore no need for clock generator 140 to be phase-locked to clock generator 40. Of course, its frequency must nominally be the same as clock generator 1, for example 44.1 kHz (such as the Abracon ABMX0127 clock oscillator). Phase processor 154 operates as described above for the synthetic data example. Since the FFT analysis window T will be identical to the repetition period T for the ensemble of randomly phased tones (all of which are harmonics of the frequency 1/T), there is no "scalloping" loss for Fourier components which are not harmonics of 1/T.

Phase processor 154 then outputs a signal represents the determined propagation delay τ to airspeed processor 158. Airspeed processor 158 uses the propagation delay τ, along with a digital air temperature signal 162 from digital air temperature sensor 160, to generate an airspeed for the vehicle. After generation, a signal 159 representing the airspeed is sent to a cockpit display and/or control electronics circuitry 170.

FIG. 5 shows a diagram 200 of a comb line spectrum 210 comprising M components spaced at a frequency interval df over a bandwidth Df=(M−1)*df. Such a spectrum can be synthesized in the time domain, with the resultant signal driving the acoustic transducer. In some embodiments, the center frequency of comb line spectrum 210 is at 10 kHz, a frequency at which the level of at least two representative commercial jet aircraft engines is more than 50 dB below the peak of the spectrum (see FIGS. 12 and 13).

Figure 7:
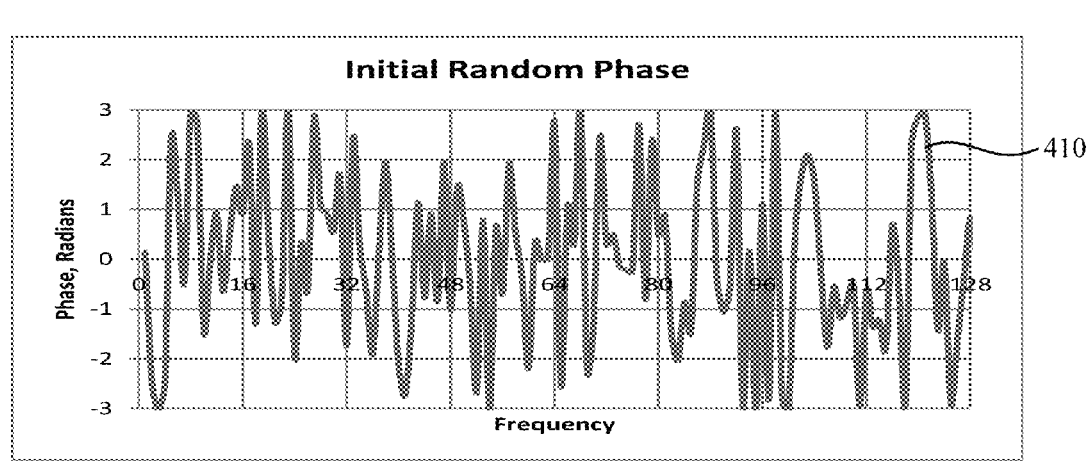
FIG. 7 shows a graph illustrating an initial signal having Fourier component random phase that may be used in accordance with the Acoustic Airspeed Measurement System and Method.
Figure 8:
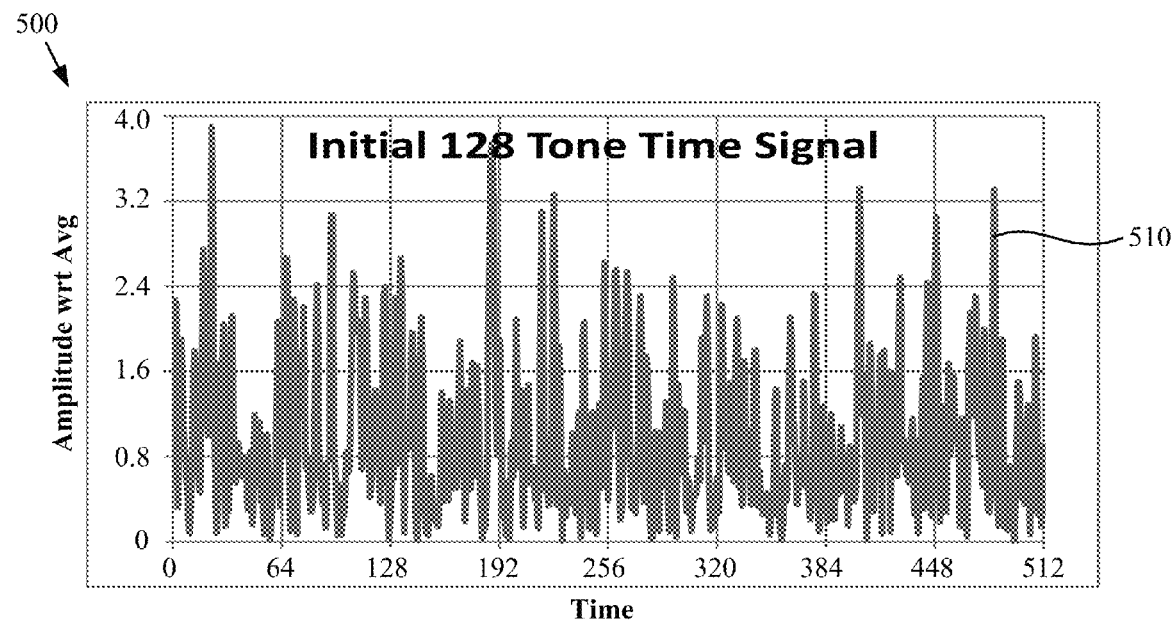
FIG. 8 shows a graph illustrating an initial time domain signal containing 128 uniformly spaced, equal-amplitude, randomly phased tones having a peak-to-average power ratio of 15.2 that may be used in accordance with the Acoustic Airspeed Measurement System and Method.

As shown in FIG. 6, which illustrates a graph 300 of a time domain signal 310 containing 128 uniformly spaced, equal-amplitude, co-phased tones, time domain signal 310, which drives amplifier 70, has a very high crest factor, or peak-to- To reduce the PAPR, a waveform was synthesized using equal amplitude but randomly phased components, with the phase generated using any random number generator such as found in, for example, EXCEL® or MATLAB®. The random phase sequence is computed as a fixed sequence for all acoustic wind speed measuring systems; there is no reason to change it or have system-to-system differences. A graph 400 illustrating the resultant phase signal 410 is shown in FIG. 7. Frequency domain components of equal amplitude, but with the random phase, were then inverse Fourier transformed into the time domain waveform 510 as shown in graph 500 of FIG. 8.

Although the crest factor, 3.90, is far lower than that of the co-phased signal, it was reduced even further through the following algorithm:

1. Numerically limit the highest amplitudes to some value that clips off just a few of the highest peaks such as 3.9 in waveform 510 of FIG. 8.
2. Fourier transform the time domain signal back into the frequency domain, which results in a) small variations in the amplitude of the Fourier components and b) small out-of-band components (components other than the original set).
3. Inverse transform back to the time domain, and numerically limit as in step 1.
4. Continue until the crest factor has dropped to some reasonably low value and the amplitude ripple in the Fourier components becomes unacceptable.

The final random phase set is ψ(f).

Figure 9:
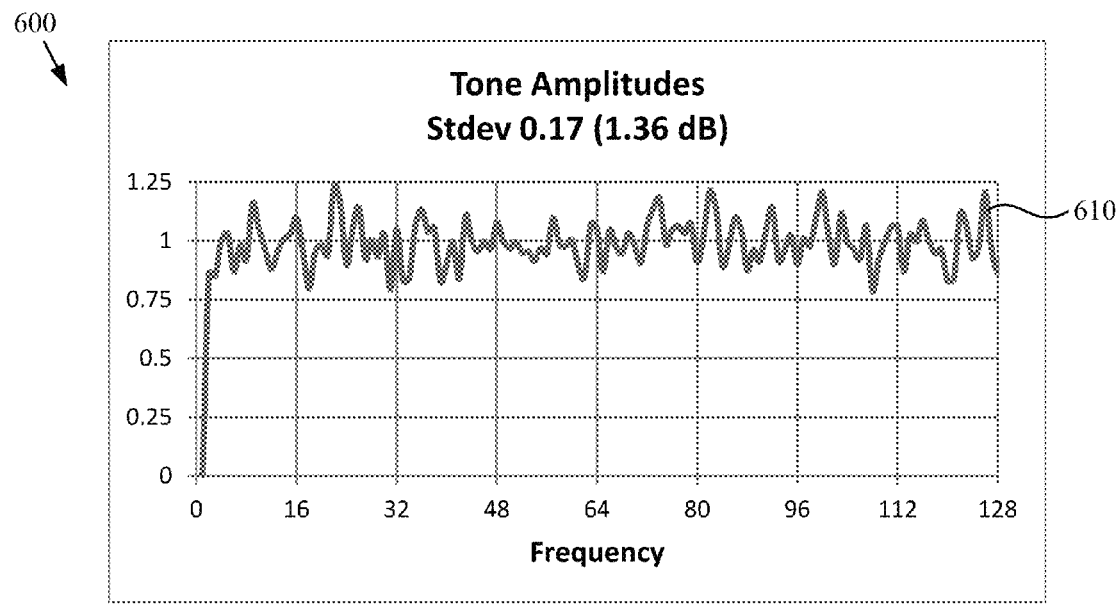
FIG. 9 shows a graph illustrating the variation in tone amplitude after further reductions in the peak-to-average ratio of the signal in the time domain having 128 quasi-equal amplitude Fourier components that may be used in accordance with the Acoustic Airspeed Measurement System and Method.
Figure 10:
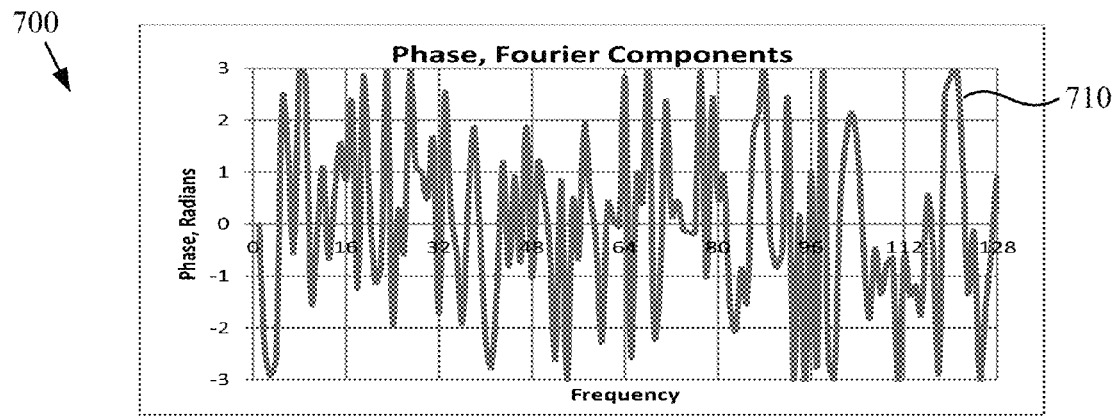
FIG. 10 shows a graph illustrating random phase of Fourier components after further reductions in the peak-to-average ratio of the signal in the time domain.

FIG. 9 shows a graph 600 the amplitude 610 of the components of the 128 tone spectrum which yielded time domain PAPR of 8.1 dB. The amplitude variation has a standard deviation of 1.4 dB. FIG. 10 shows a graph 700 of the quasi-random phase variation 710 of the 128 spectral components.

Figure 11:
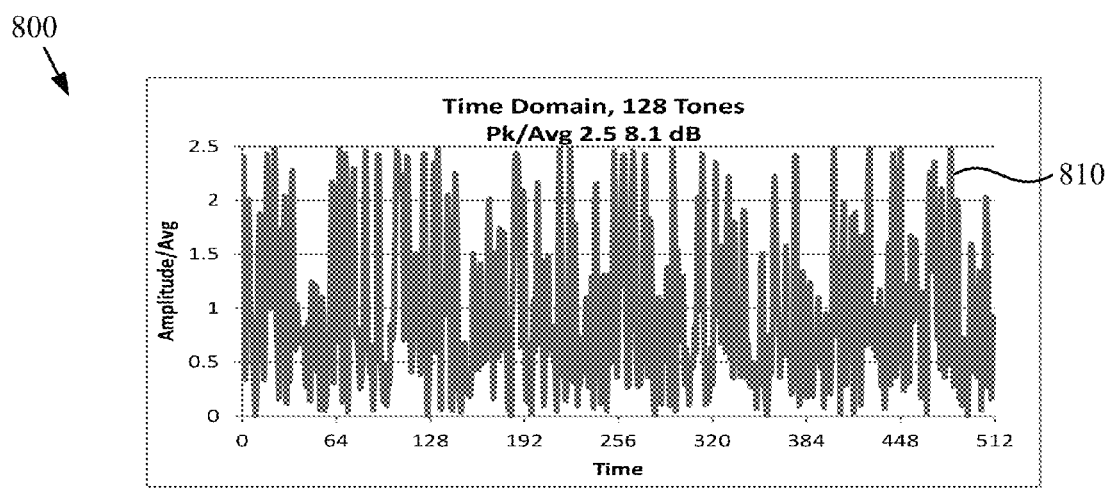
FIG. 11 shows a graph illustrating a time domain waveform for 128 randomly phased Fourier components after iterative reductions in peak-to-average power ratio.

FIG. 11 shows a graph 800 illustrating a time domain waveform 810 for 128 randomly phased Fourier components. This is a repetitive waveform for which the m, m+512, m+1024, m+N*512, time samples all have the same phase and amplitude. While the waveform shown in FIG. 11 is one example of a type of waveform that may be used within system 10, there may be other types of waveforms that may be used that could exhibit even lower PAPR values.

The overall bandwidth, Df, of the comb line spectrum determines the accuracy of the measurement system. The measurement system should be able to distinguish between slopes which differ by ⅛=0.125 cycles over Df. As above, following equation 4, dτ must be ~0.1 msec for L=40 m, $V_0$=340.3 m/s (sea level), $dV_a$=2.4 m/s at $V_a$=150 knots. Thus 0.1 msec=0.125/Df, and Df must be 1250 Hz, much less than the 10 kHz required for delay measurement using the time domain pulse technique. Determination of slope resolution, and therefore just exactly what Df must be, will have to await measurements of the power spectrum of aircraft engine and wind noise, and available audio power.

It may be possible to use the absolute phase of the spectrum to increase the accuracy of the airspeed measurement by an order-of-magnitude. The absolute phase is a highly ambiguous parameter, i.e., at a frequency of 10 kHz, a given phase corresponds to multiples of 0.1 msec. If the measurement of delay really can be made to an uncertainly of less than 0.1 msec, then the phase will further refine the measurement. As an example, phase measurement accuracy of ⅛ cycle at 10 kHz would enable a delay measurement accuracy of 12.5 μsec.

Unlike a Pitot-Static tube, system 10 can be calibrated and functionality verified during pre-flight checkout. It can easily be verified that the acoustic signal is being radiated and received. If a Pitot-Static tube is blocked, or partially blocked, such a problem cannot be identified during pre-flight. However, with system 10, the absence or suppression of a received signal will be obvious. If there is little or no wind, the calibration can be checked, or if there is wind and the vector velocity information can be provided, the calibration can be checked.

Referring to FIGS. 12 and 13, FIG. 12 shows a graph 900 of a noise level 910 for a Boeing 747 during landing compared to background noise 920, while FIG. 13 shows a graph 1000 of a noise level 1010 for an Airbus 320 during landing compared to background noise 1020. Graphs 900 and 1000 are from the "Low Frequency Noise Study," Penn State, Purdue, Univ. Central Florida, Boeing, G. E. Aircraft Engines, Rannoch Corporation, Volpe Transportation Center, Wyle Laboratories. As shown in both graphs 900 and 1000, there is a steep decline at frequencies above 10 kHz, which is why system 10 should preferably operate at a frequency of about 10 kHz or higher. Note that the noise level at frequencies less than 10 kHz is up to 50-60 dB higher than the level for components higher than 10 kHz. Although FFT analysis of the combined jet engine plus acoustic signal will result in a large increase in signal-to-noise ratio, a mechanical filter placed in front of the microphone will greatly reduce the over-all jet engine noise level. Note that for both jet engines, at a frequency of about 10 kHz the spectral noise power is more than 50 dB lower than at the peak of the spectrum. One such very simple filter is a closed-tube pipe. The relationship between the length of the tube, £; the resonant frequency, $f_R$; and the speed of sound within the tube, $V_0$, is given approximately by £=$0.25*V_0/f_R$, with $f_R$=10 kHz (i.e., the center of the comb line spectrum) and $V_0$=approximately 1000 ft/sec at sea level, £=0.3 inches.

It should be noted that because this relationship depends on the speed of sound, if the closed pipe filter is located in an unpressurized area of the plane (such as the inside of the vertical stabilizer), the center frequency of the comb spectrum will have to vary in proportion to the local speed-of-sound. However, the local speed of sound is always available to any device within an aircraft because it is a simple function of temperature, a parameter which is always routinely collected. The center frequency of the comb line spectrum can be automatically programmed to be within the transducer driver filter 60.

Figure 14A:
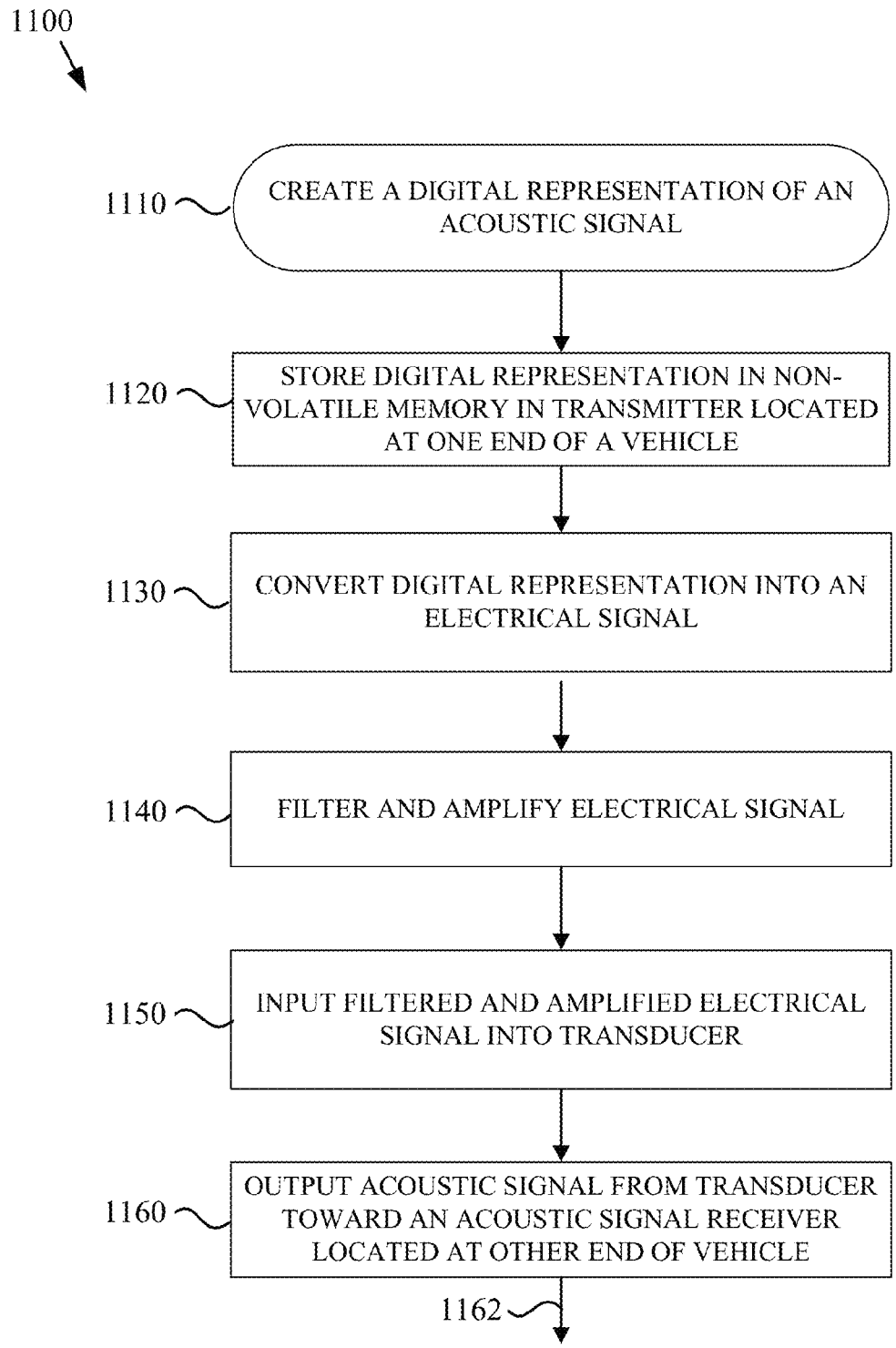
FIGS. 14A and 14B show a flowchart of an embodiment of a method in accordance with the Acoustic Airspeed Measurement System and Method.
Figure 14B:
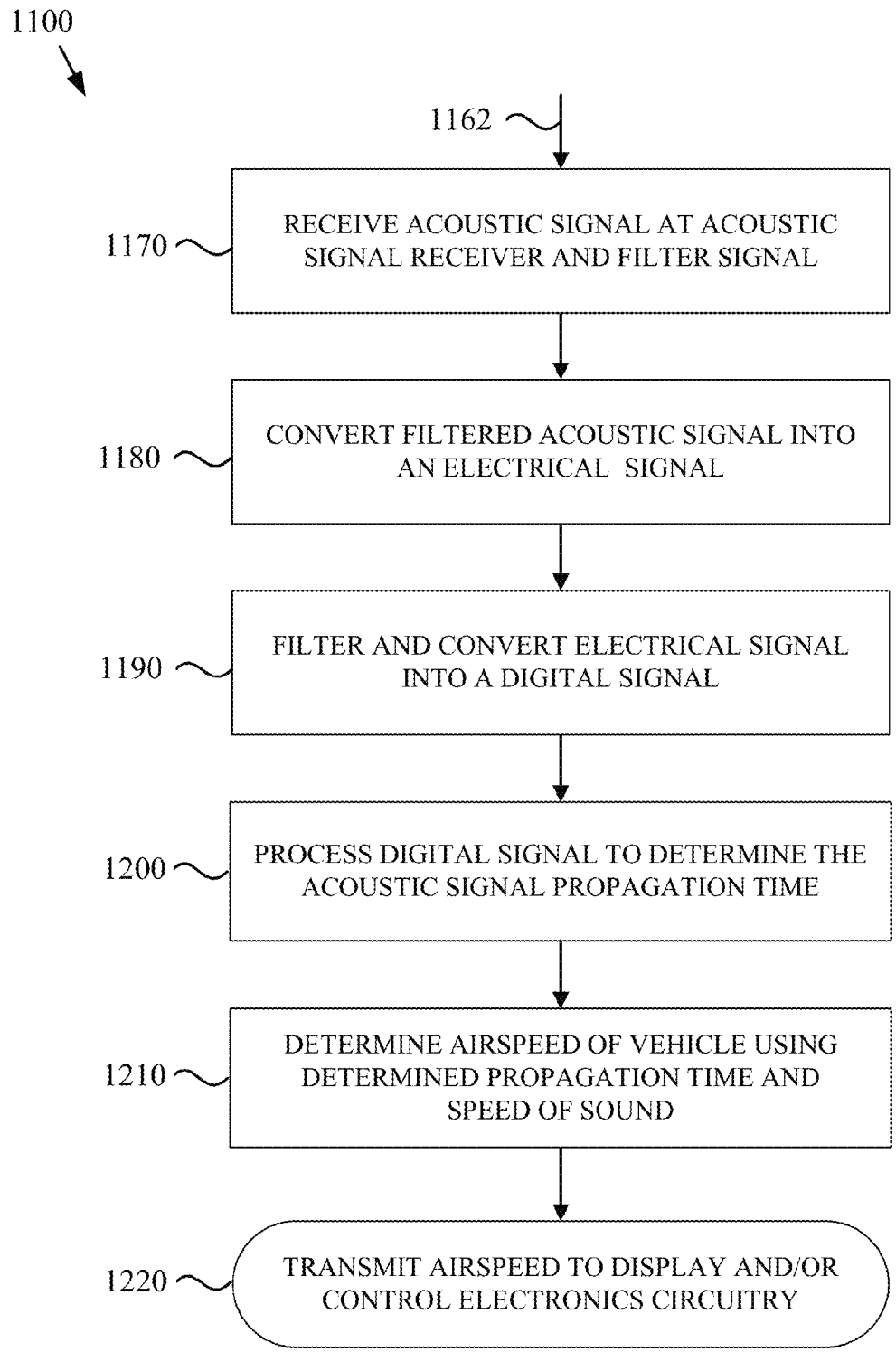

FIGS. 14A and 14B show a flowchart of an embodiment of a method 1100 for use with the system in accordance with the Acoustic Airspeed Measurement System and Method. As an example, method 1100 may be performed by system 10 detailed in FIGS. 1-4 detailed herein. Correspondingly, method 1100 will be discussed with reference to system 10 and its respective components. Further, while FIGS. 14A and 14B show one embodiment of method 1100 to include steps 1110-1220, other embodiments of method 1100 may contain fewer or more steps. Further, while in some embodiments the steps of method 1100 may be performed as shown in FIGS. 14A and 14B, in other embodiments the steps may be performed in a different order, or certain steps may occur simultaneously with one or more other steps.

Referring now to FIG. 14A, method 1100 may begin at step 1110, which involves creating a digital representation of an acoustic signal. Step 1110 may be performed using EXCEL®, MATLAB® or some other application software to create quasi-randomly phased Fourier components yielding a minimum PAPR time domain waveform. Step 1120 may then involve storing the digital representation of the acoustic signal in non-volatile memory 30 contained within a transmitter 20 coupled to a first end of a vehicle. Step 1130 then involves converting the digital representation of the acoustic signal into an electrical signal. As an example, step 1130 may be performed by DAC 50. In some embodiments, the output of memory 30 may be repetitively clocked into DAC 50 using a clock signal from clock generator 40. For example, the signal shown in FIG. 12, which could be the output of DAC 50, could repeat every 512 time samples. Step 1140 then involves filtering, via filter 60, and amplifying, via amplifier 70, the electrical signal. Step 1150 may then involve inputting the filtered and amplified electrical signal into transducer 80. Next, step 1160 involves outputting acoustic signal 82 from transducer 80 towards acoustic signal receiver 90 coupled to a second end of the vehicle.

Referring to FIG. 14B, method 1100 may then proceed along flow path 1162 to step 1170, where acoustic signal receiver 90 receives and filters acoustic signal 82 using filter 100. In step 1180, microphone 110 converts the filtered acoustic signal into an electrical signal. Next, step 1190 involves electrically filtering the electrical signal using filter 120 and converting the filtered electrical signal into a digital signal using ADC 130. Step 1200 may then involve processing, using processor 150, the digital signal to determine the acoustic signal propagation time. Step 1210 involves determining, using processor 150 and the digital sample of the outside air temperature 162 from sensor 160, an airspeed of the vehicle using the determined propagation time and determined outside air speed of sound, with such determination being performed by using Eq. 3 from above. Finally, step 1220 involves sending a signal 159 representing the determined airspeed of the vehicle to a display or control electronics circuitry 170, which is operatively connected to processor 150. Circuitry 170 may include a flight computer which is used to compute flight times, auto-pilot circuitry, alarm circuitry, or various other circuitry necessary for control and monitoring.

Some or all of the steps of method 1100 may be stored on a computer-readable storage medium, such as a non-transitory computer-readable storage medium, wherein the steps are represented by computer-readable programming code. The steps of method 1100 may also be computer-implemented using a programmable device, such as a computer-based system.

Method 1100 may comprise instructions that may be stored within a processor or may be loaded into a computer-based system, such that the processor or computer-based system then may execute the steps of method 1100. Method 1100 may be implemented using various programming languages, such as Java®, "C" or "C++" or application software such as EXCEL® or MATLAB®.

Various storage media, such as magnetic computer disks, optical disks, and electronic memories, as well as non-transitory computer readable storage media and computer program products, can be prepared that can contain information that can direct a device, such as a micro-controller or processor, to implement method 1100. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods. Many modifications and variations of the Acoustic Airspeed Measurement System and Method are possible in light of the above description. Within the scope of the appended claims, the embodiments of the subject matter described herein may be practiced otherwise than as specifically described. The scope of the claims is not limited to the implementations and the embodiments disclosed herein, but extends to other implementations and embodiments as may be contemplated by those persons having ordinary skills in the art.

I claim:

1. A method comprising the steps of:
creating a digital representation of an acoustic signal using a waveform and random phase values stored in non-volatile memory contained within a transmitter coupled to a first end of a vehicle, wherein the digital representation of the acoustic signal comprises a continuous wave form having Fourier components of substantially equal amplitude and random phase;
converting the digital representation of the acoustic signal into an electrical signal;
filtering and amplifying the electrical signal;
inputting the filtered and amplified electrical signal into a transducer contained within the transmitter;
outputting the acoustic signal from the transducer towards an acoustic signal receiver coupled to a second end of the vehicle;
receiving and filtering the acoustic signal at the acoustic signal receiver;
converting the filtered acoustic signal into a digital signal; and
using a processor contained within the acoustic signal receiver to perform the steps of
computing the amplitude and phase of each of the spectral components of the digital signal, wherein for each frequency component the phase is computed by subtracting a respective one of the random phase values from a measured phase value, where the random phase values are retrieved from non-volatile memory contained within the processor,
determining a cumulative phase wrap count, wherein the cumulative phase wrap count is a cumulative total of phase wraps for each of the frequency components of the digital signal where a phase wrap is determined by determining that a phase change between successive phases is less than zero,
determining the acoustic signal propagation time of the acoustic signal from the transducer to the acoustic signal receiver, $\tau$, by determining the root mean square (RMS) best-fit slope of an unwrapped phase as a function of frequency, wherein the unwrapped phase is the sum of the phase for each of the frequency components and the cumulative phase wrap count, and
determining an airspeed of the vehicle using the determined acoustic signal propagation time.

2. The method of claim 1, wherein the airspeed of the vehicle is determined according to the equation $Va=L/\tau-V_0$, where Va is the airspeed, $V_0$ is the speed-of-sound in still air, and L is a baseline from the transducer to the acoustic signal receiver.

3. The method of claim 1, wherein the vehicle is an aircraft, wherein the first end includes a nose portion and a cockpit of the aircraft and the second end includes a tail portion of the aircraft.

4. The method of claim 1, wherein the acoustic signal has a duty cycle of about 100% and a peak to average amplitude ratio of less than 2.5.

5. The method of claim 1, wherein the step of converting the filtered acoustic signal into a digital signal includes the steps of converting the filtered acoustic signal into an electrical signal using a microphone and converting the electrical signal into the digital signal using an analog-to-digital converter.

6. A method comprising the steps of:
radiating an acoustic signal from a transducer coupled to the exterior of a first end of an aircraft to an acoustic signal receiver coupled to a second end of the aircraft, the acoustic signal generated by repetitively inputting a digital representation of the acoustic signal from transmitter non-volatile memory operatively connected to the transducer into a digital-to-analog converter, converting the digital representation of the acoustic signal into an electrical signal using the digital-to-analog converter, filtering and amplifying the electrical signal, and routing the filtered and amplified electrical signal to the transducer, the digital representation of the acoustic signal comprising a continuous wave form having Fourier components of substantially equal amplitude and random phase generated from random phase values stored in the transmitter non-volatile memory;
receiving and filtering the acoustic signal at the acoustic signal receiver;
converting the filtered acoustic signal into a digital signal; and
using a processor contained within the acoustic signal receiver to perform the steps of
computing the amplitude and phase of each of the spectral components of the digital signal, wherein for each frequency component the phase is computed by subtracting a respective one of the random phase values from a measured phase value, where the random phase values are retrieved from non-volatile memory contained within the processor, determining a cumulative phase wrap count, wherein the cumulative phase wrap count is a cumulative total of phase wraps for each of the frequency components of the digital signal where a phase wrap is determined by determining that a phase change between successive phases is less than zero, determining the acoustic signal propagation time of the acoustic signal from the transducer to the acoustic signal receiver, $\tau$, by determining the root mean square (RMS) best-fit slope of an unwrapped phase as a function of frequency, wherein the unwrapped phase is the sum of the phase for each of the frequency components and the cumulative phase wrap count, and determining an airspeed of the aircraft according to the equation $Va=L/\tau-V_0$, where Va is the airspeed, $V_0$ is the speed-of-sound in still air, and L is a baseline from the transducer to the acoustic signal receiver.

7. The method of claim 6, wherein the first end includes a nose portion and a cockpit of the aircraft and the second end includes a tail portion of the aircraft.

8. A system comprising:

a transmitter, coupled to a first end of a vehicle, comprising transmitter non-volatile memory having a digital representation of an acoustic signal stored therein, a digital-to-analog converter operatively connected to the non-volatile memory and configured to receive and convert the digital representation of the acoustic signal into an electrical signal, a filter operatively connected to the digital-to-analog converter and configured to filter the electrical signal, an amplifier operatively connected to the filter and configured to amplify the filtered electrical signal, and a transducer operatively connected to the filter and configured to receive and radiate the amplified electrical signal, wherein the digital representation of the acoustic signal comprises a continuous wave form having Fourier components of substantially equal amplitude and random phase generated from random phase values stored in the transmitter non-volatile memory; and an acoustic signal receiver, coupled to a second end of the vehicle, comprising a first filter configured to acoustically filter the radiated acoustic signal, a microphone operatively connected to the first filter and configured to convert the filtered acoustic signal into a received electrical signal, a second filter to electrically filter the output of the microphone, an analog-to-digital converter operatively connected to the second filter and configured to convert the received electrical signal into a received digital signal, and a processor operatively connected to both the analog-to-digital converter and a digital air temperature sensor, the processor configured to compute the amplitude and phase of each of the spectral components of the digital signal, wherein for each frequency component the phase is computed by subtracting a respective one of the random phase values from a measured phase value, where the random phase values are retrieved from non-volatile memory contained within the processor, determine a cumulative phase wrap count, wherein the cumulative phase wrap count is a cumulative total of phase wraps for each of the frequency components of the digital signal where a phase wrap is determined by determining that a phase change between successive phases is less than zero, determine the acoustic signal propagation time of the acoustic signal from the transducer to the acoustic signal receiver, $\tau$, by determining the root mean square (RMS) best-fit slope of an unwrapped phase as a function of frequency, wherein the unwrapped phase is the sum of the phase for each of the frequency components and the cumulative phase wrap count, and determine an airspeed for the vehicle according to the equation $Va=L/\tau-V_0$, where Va is the airspeed, $V_0$ is the speed-of-sound in still air, and L is a baseline from the transducer to the acoustic signal receiver.

9. The system of claim 8, wherein the substantially equal amplitudes have standard deviations of less than 1.4 dB.

10. The system of claim 8, wherein the acoustic signal has a duty cycle of about 100% and a peak to average amplitude ratio of less than about 2.5.

11. The system of claim 8, wherein the vehicle is an aircraft, wherein the first end includes a nose portion and a cockpit of the aircraft and the second end includes a tail portion of the aircraft.

12. The system of claim 8, wherein the processor is further operatively connected to a cockpit display and control electronics circuitry and is further configured to send a signal representing the airspeed of the vehicle to at least one of the cockpit display and the control electronics circuitry.

* * * * *